No. 823,872. PATENTED JUNE 19, 1906.
D. W. JONES.
EARTH CUTTER AND GRADER.
APPLICATION FILED AUG. 29, 1905.

3 SHEETS—SHEET 1.

WITNESSES:

Daniel W. Jones
INVENTOR.
BY Geo. H. Strong.
ATTORNEY.

No. 823,872. PATENTED JUNE 19, 1906.
D. W. JONES.
EARTH CUTTER AND GRADER.
APPLICATION FILED AUG. 29, 1905.

3 SHEETS—SHEET 2.

WITNESSES:

Daniel W. Jones
INVENTOR.
BY Geo. H. Strong
ATTORNEY.

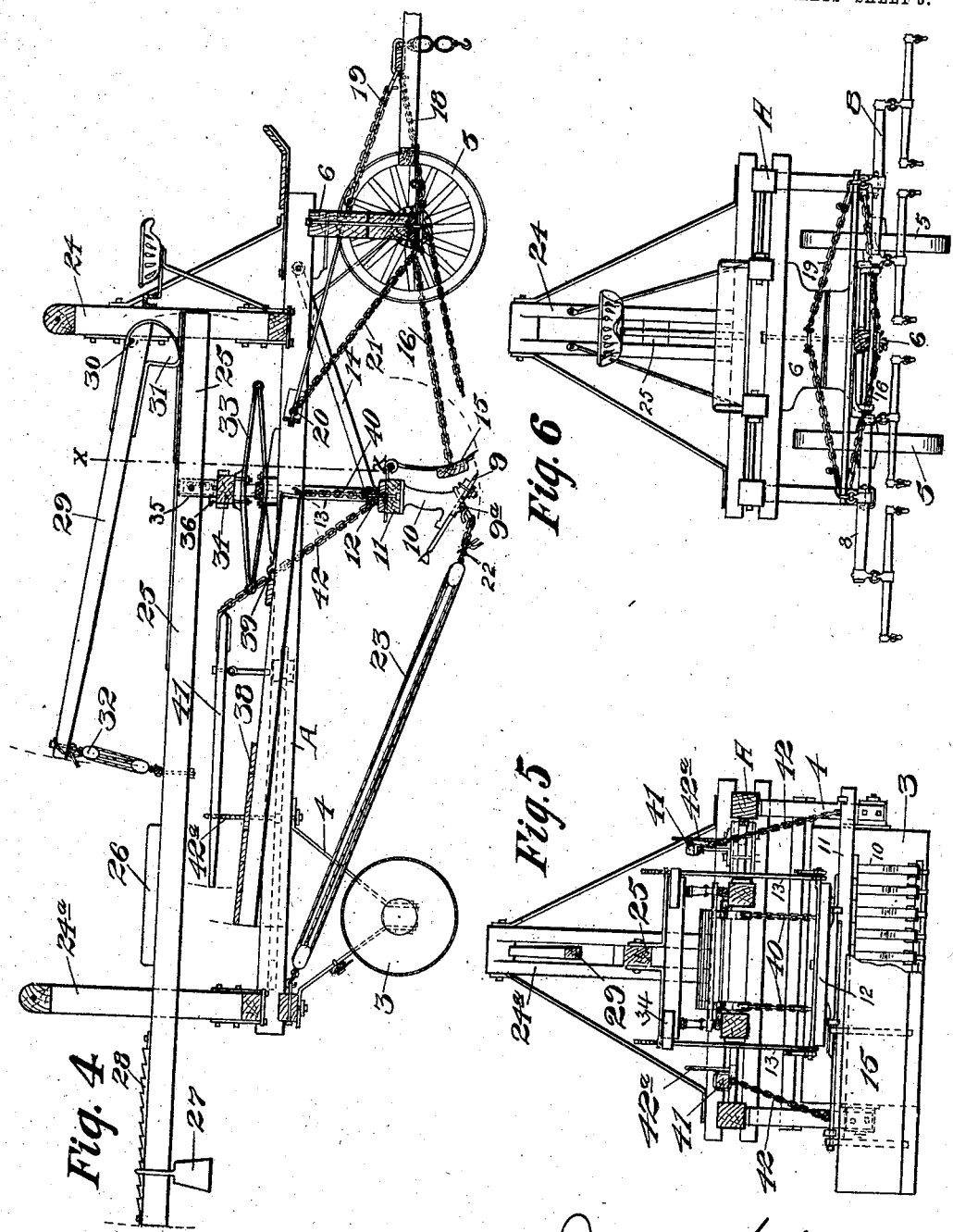

UNITED STATES PATENT OFFICE.

DANIEL W. JONES, OF SACRAMENTO, CALIFORNIA.

EARTH CUTTER AND GRADER.

No. 823,872.     Specification of Letters Patent.     Patented June 19, 1906.

Application filed August 29, 1905. Serial No. 276,240.

*To all whom it may concern:*

Be it known that I, DANIEL W. JONES, a citizen of the United States, residing at Sacramento, in the county of Sacramento and State of California, have invented new and useful Improvements in Earth Cutters and Graders, of which the following is a specification.

My invention relates to an apparatus which is especially designed for chiseling or cutting away the surface of roads or the like and for grading and equalizing surfaces of the same.

It consists in the combination of mechanism and details of construction, which will be more fully explained by reference to the accompanying drawings, in which—

Figure 1:
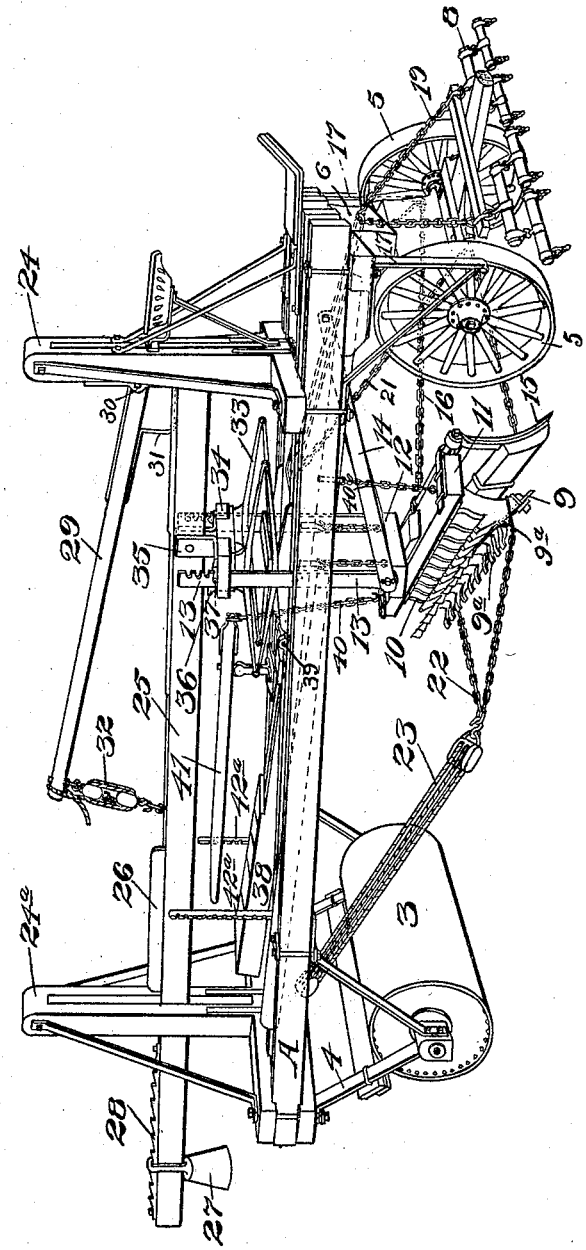
Figures 2, 3:
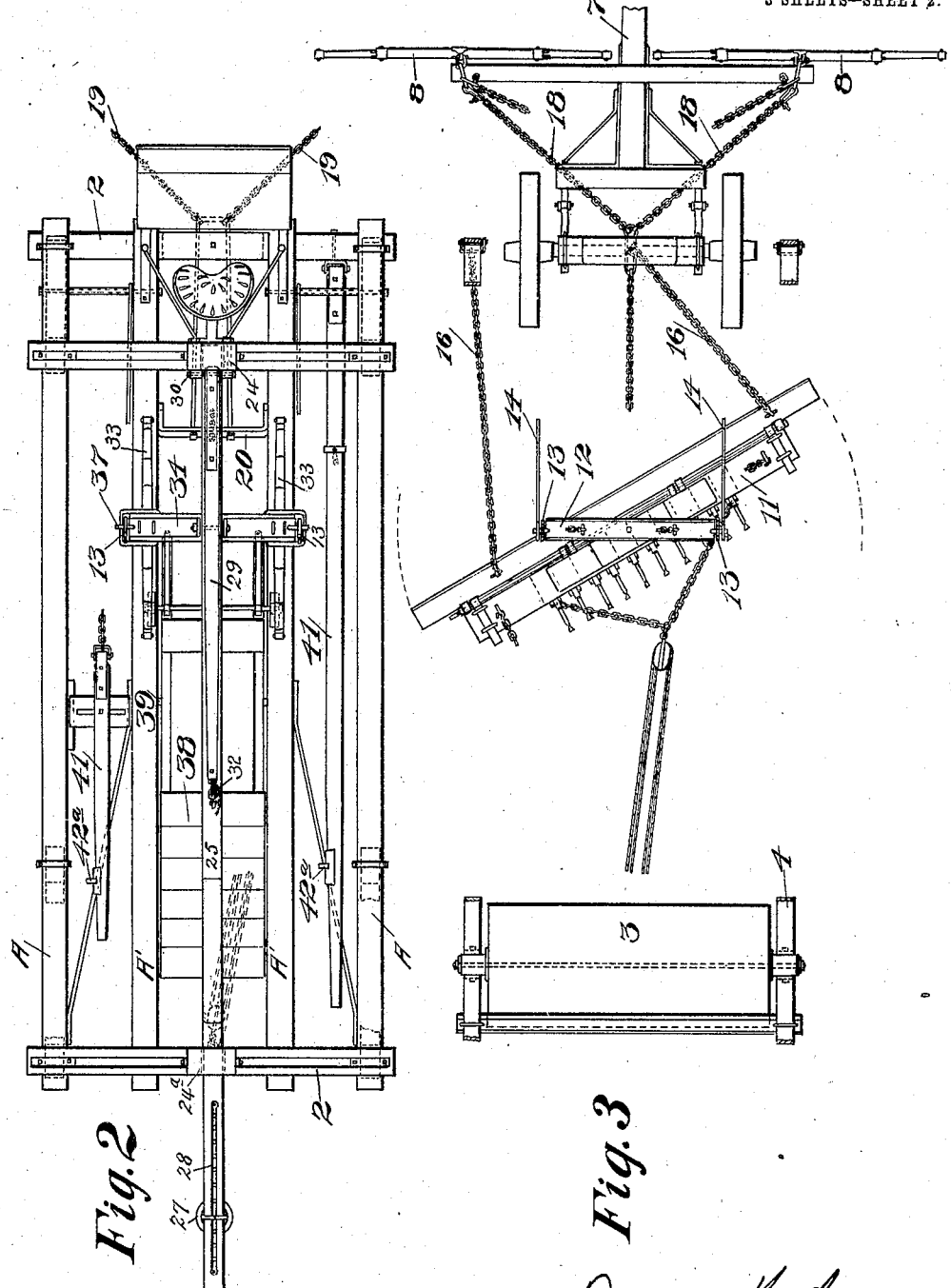

Figure 1 is a perspective view of my machine. Fig. 2 is a plan of the frame and upper portion of the machine. Fig. 3 is a plan view of the cutter and scraper and front portion of the running-gear. Fig. 4 is a side elevation and partial section. Fig. 5 is a transverse section through X X of Fig. 4. Fig. 6 is a front end view.

It is the object of my invention to provide in a single apparatus mechanism for chiseling, cutting, or loosening rough hard irregular surfaces and afterward grading, rolling, and compacting the material to form a road or other desired surface.

The frame consists of longitudinal timbers A and A' with suitable cross-timbers, as at 2, by which they are firmly united. The rear end of the apparatus is supported upon a roller 3, the shaft of which is journaled in suitable brackets 4, which are secured to the frame of the machine. The front end of the machine is supported upon bearing-wheels, as at 5, connected with the frame by a king-bolt, as at 6, passing through the axle and bolster, so that the front wheels may be turned to guide the machine.

7 is a pole connected with the front axle, as shown, and 8 represents the single and double trees for the attachment of the team to haul the machine.

The working portion of the apparatus consists of chisel or cutter teeth 9, fixed to standards 10, which are bolted to a transverse beam 11, and this beam is swiveled and turnable about the king-bolt passing through a superposed timber 12, which timber 12 is suspended from the framework of the apparatus by vertically-disposed bars 13 and attachments, which will be more fully described. The bar 12 is suitably braced from the main frame by distance rods or bars, as at 14. To the front portion of the cutter-head or timber 11 is hinged the upper edge of the scraper 15, so that its lower and cutting edge may be allowed to engage the surface of the ground, or it may be swung up out of the way by turning it about its hinges, thus raising it above the surface of the ground when the chisel or cutter teeth are in operation, and it may be let down again when it is desired to use it as a scraper. Under certain conditions the two may be used in unison. This part of the apparatus is connected by chains 16 with some fixed portion of the machine, so that the draft may be directly upon the scraper, and it is also suspended from the levers 25 and 41 by chains, as at 40 and 42, which will allow a vertical adjustment, hereinafter described. The timber 12, upon which the scraper-frame is swiveled, is also suspended by bars 13, thus giving considerable freedom of movement to the apparatus. The scraper, digger, or cutter is designed to be drawn over the surface to be operated upon. Wherever these parts stand diagonally with the line of travel, the diagonal position is effected by connecting one of the chains 16 with a fixed dependent standard, (shown at 17 in Fig. 1,) while the other chain is carried to the center of the front-wheel axle and connected with the king-bolt or equivalent attachment, so that the draft from one side will be directly from the axle and the other side will be from the standards and frame contiguous to the wheel-axle. By this construction it will be seen that the wheels may be turned to guide the machine in any direction without affecting the draft-chains and the position of the cutter teeth and scraper. The doubletrees and draft connections are in like manner connected with the king-bolt and central-draft appliances by chains, as at 18. Other chains, as at 19, extend from the draft-bar upward and are connected by rods or otherwise with an angle-plate 20, fixed across the inner frame-timbers A' of the machine, and still other chains 21 connect this angle-plate with the central portion of the wheel-axle. By this construction of flexible connections with the different parts of the apparatus I insure a direct draft upon all parts of the apparatus to which it is necessary to apply it.

By means of chains, as at 22, and a block and tackle, as at 23, connection may be made between the standards 10 of the cutters and the rear portion of the frame, and the suspended cutter-frame may thus be held as rigidly as may be desired.

In order to operate the mechanism herein described to raise and lower the cutters and scraper, I have shown an apparatus carried upon the upper part of the frame and consisting of springs, from which the cutter-frame and suspending-bars 13 are supported, and a fulcrumed seat-bar movable up and down by the weight of the driver, as will be hereinafter described.

24 represents vertical posts fixed near opposite ends and central of the main frame A A'.

25 is a lever extending longitudinally and guided between in the slots of the posts 24.

26 is a seat fixed upon the rear portions of the lever, and 27 is a weight which may be adjusted on a toothed rack 28 upon the rear end of the lever and by which the weight of the driver may be assisted, as may be desired.

29 is a lever fulcrumed to the front guide-post 24, as shown at 30. This lever has a cam 31, formed upon its front end and normally pressing upon the top of the front end of the lever 25. Its rear end may be connected with the lever 25 by block and tackle, as at 32, and this is then under control of the driver, so that it may be released and the lever 29 turned about its fulcrum to change the position of the cam 31 and its pressure upon the lever 25.

33 represents springs, here shown as elliptic springs, firmly mounted from the central longitudinal timbers A' of the frame. Across the top of these springs extends a bar 34, to which the springs are firmly clipped. The lever 25 is connected with this bar by plates 35, pivoted upon each side of the bar and secured to the top of the beam 34. The vertical bars or plates 13, having their lower ends connected, as previously described, with the transverse beam 12, extend up through slots in the beam 34, and these bars are notched or toothed, as shown, the teeth engaging with pins or plates fixed to the timber 34, so that the teeth of the bars 13 may be made to engage them, and the bars are held in engagement by wedges 36, which pass through the beam 34 behind the bars 13, thus holding them in engagement with the pins, as shown at 37. By removing the wedges the bars 13 may be drawn backward to disengage them from the pins and then raised or lowered to change the relative position of the cutters and scraper to the springs, upon which it will now be seen they are supported.

38 is a lever-platform located beneath the seat 26, which is mounted upon the lever 25, and this lever-platform is fulcrumed, as shown at 39. The rear portion of the platform serves for the rider's feet. The front ends is connected by chains, as at 40, with the transverse beam 12, from which the cutters and scraper are suspended.

41 represents hand-levers fulcrumed, as shown, and chains 42 connect the front ends of the levers with the beam 12. The rear ends of the levers are held in any desired position by racks, as at 42$^a$.

The operation of the apparatus will then be as follows: The rider, sitting upon the seat 26 and having his feet upon the platform 38, may by the aid of his weight depress the rear end of the lever 25, the front end being guided in the vertical front post 24 and the rear end in the vertical rear post 24$^a$. The front end of the lever 25 is practically fulcrumed against the cam 31, so that any weight brought upon the lever will depress that portion which rests upon the springs 33 and through the bars 13 will also depress the bar 12 and the cutter-carrying bar or frame 11, while the raising of the feet or lightening of the pressure upon the foot-lever 38 assists in this operation. When it is desired to raise the plows, the driver by pressing more heavily upon the foot-platform 38 and raising his weight from the seat 26 will by this double operation allow the springs 33 to act and raise the cutters and scraper. Thus the operator has full control over the depth of cutting and can regulate it to suit his convenience and the exigencies of the work.

The cutters 9 are made double-pointed, one end being given a comparatively sharp cutting-point and the other may be twisted and given a broader cutting edge. These cutters are clipped to the lower ends of the standards 10 and in addition are pressed upon by eccentrics, as at 9$^a$, which may be turned up against the cutters or may be turned down to release them of the pressure.

The block and tackle and the front chains connected with the scraper serve to regulate the angle of the scraper and the cutter by taking up the chains in front and letting out the block and tackle or by letting out the chains and taking up the block and tackle, and the depth of the cut may be similarly regulated. The block and tackle and chains also serve to prevent the rocking and vibrating of the cutter-frame, which being thus flexibly and turnably supported and connected is readily adjusted to any desired position and steadied in its operation. When it is desired to cause one end to cut deeper than the other, this object is attained by freeing the cutter-bar from any rigid connections and moving the levers 41 up or down. These levers will act through the connecting-chains to raise or lower the ends of the cutter-carrying-frame.

Having thus described my invention, what I claim, and desire to secure by Letters Patent, is—

1. An apparatus of the character described comprising a main frame, turnably-mounted wheels at the front thereof, a roller at the rear of the frame, a cutter, a scraper in advance of the cutter and connected thereto, means for applying draft directly to said scraper and cutter, and means coacting with the last-named means for adjusting the angle of the cutter and the scraper.

2. An apparatus of the character described comprising a main frame with rear bearing-roller and front, turnably-supported bearing-wheels, a cutter and scraper suspended between said roller and wheels, a hinge connection between the cutter and scraper whereby the scraper may be thrown into and out of action, means for applying draft directly to the scraper and cutter, and means coacting with the last-named means for adjusting the angle of said cutter and scraper.

3. An apparatus comprising a main frame with a rear bearing-roller and front, turnably-supported bearing-wheels, a cutter and scraper suspended between said roller and wheels, connections between the cutter and scraper, and a draft apparatus, and adjustable connections between the rear of the cutter and scraper, and the rear portion of the main frame.

4. An apparatus comprising a main frame, front turnable bearing-wheels and a rear roller, a cutter and scraper suspended between the bearing-wheels and roller, means for varying the pressure upon said cutter and scraper, and means consisting of draft-chains in front and block and tackle in the rear whereby the angle of the cutters and the depth cut are adjusted.

5. An apparatus comprising a main frame, front turnable bearing-wheels and a rear supporting-roller, a frame or bar, cutters fixed to said bar, connections between the bar and the king-bolt and frame at the front, and connections between the rear of the cutters and the rear of the frame whereby rocking and vibration are prevented.

6. An apparatus comprising a main-frame with bearing-wheels and a roller at opposite ends, a frame or bar having cutters supported therefrom, and a scraper hinged thereto, a suspending mechanism and a swivel-pin about which the cutters and scraper are turnable, draft-chains connecting with the scraper and having one end connected with the king-bolt of the front wheels and the other with a fixed attachment to the frame whereby the cutters and scraper may be turned to stand at an angle with the line of travel of the machine.

7. An apparatus comprising a main frame, bearing and steering wheels and a roller by which the opposite ends of said frame are supported, a bar having cutters and a scraper carried thereon, draft-chains connecting the scraper with the center of the front axle and with either side of the main frame, a transverse timber to which the cutter-bar is centrally swiveled, bars extending upwardly, springs mounted upon the main frame upon which the upper end of said bars are carried, and a mechanism by which the springs are compressed or allowed to extend to vary the depth at which the cutters and scraper operate.

8. An apparatus comprising a main frame, steering-wheels at the front and a roller at the rear, a cutter and a scraper and a supporting-bar therefor, a transverse bar having distance-rods connected with the main frame and to which the cutter and scraper bar is turnably swiveled, springs mounted upon the main frame, a transverse bar resting upon said springs, vertical bars connecting the cutter, and the bar which rests upon the springs, and means for raising and lowering said suspended bars with relation to the spring-bar.

9. An apparatus comprising a main frame, guiding-wheels at the front and a roller at the rear, cutters and scraper and a bar upon which they are carried between the wheels and roller, a transverse bar to which the cutter-bar is swiveled, draft-chains and connections by which the angle of travel of the cutter-bar may be changed, suspending-bars extending upwardly from the bar to which the cutter-bar is swiveled, said vertical bars having teeth at the upper end, springs fixed to the main frame, a bar fixed transversely upon the springs and having slots at the ends through which the vertical bars are movable, locking devices adapted to engage the notches of the vertical bars and a vertically-movable lever connected with the transverse spring-bar whereby the springs are compressed and allowed to extend to vary the position of the cutters and scraper.

10. An apparatus comprising a main frame, front steering-wheels and a rear roller, a bar, cutters fixed thereto, and a scraper swiveled thereon, draft-chains and an antirocking connection with the rear of the cutters, springs fixed upon the main frame, a transverse bar to which the upper parts of the springs are clipped, vertical bars extending upward from the cutter-frame and adjustable in the transverse spring-bar, a lever connected with said spring-bar extending longitudinally above the main frame, guides between which said lever is movable, and a cam-lever fulcrumed above said first-named lever and movable to vary the contact of the cam with the lever.

11. An apparatus comprising a main frame, front steering-wheels and a rear roller upon which said frame is carried, a bar having cutters and a scraper carried thereon, a transverse bar upon which said cutter-bar is pivoted and turnable, draft-chains and steady devices connected therewith, springs supported from the main frame, a transverse bar resting upon said springs, side bars by which the cutters are suspended from the transverse spring-bar, a longitudinally-disposed guiding-lever connected with the spring-bar having a seat thereon, a lever fulcrumed to the front guides and having a cam beneath which the front end of the seat-lever extends, said cam-lever being movable to vary the fulcrum-point of the seat-lever.

12. An apparatus comprising a main frame, guiding-wheels and a roller by which opposite ends of said frame are supported, cutters and a scraper located between the wheels and roller, springs mounted upon the main frame, and transverse bar fixed upon the springs, side bars connecting the cutter with said transverse bar, a horizontal fulcrumed seat-bar connected with the spring-bar, a foot-lever fulcrumed beneath the seat-lever, flexible connections between the front ends of said lever and the cutter-bar, hand-levers located contiguous to the seat and foot lever, and flexible connection between said levers and the cutter-bar attachments, whereby the latter are adjusted transversely.

13. An apparatus comprising a main frame, a roller at the rear and turnable wheels at the front upon which the frame is supported, a loosely-suspended bar located between the wheels, and bar having cutters and scraper carried thereon, a pole and draft attachments connected with the axle of the front wheels, a flexible connection between one end of the cutters and the center of the wheel-axle, a similar flexible connection between the other end of the cutters and a fixed portion of the main frame, flexible connections extending upwardly from the draft devices and from the wheel-axle and connected with the main frame, whereby the draft is equalized.

14. An apparatus comprising a main frame with front steering-wheels and a rear roller upon which said frame is carried, a loosely-suspended horizontally-turnable bar having cutters and scraper carried thereon, connections between the ends of said cutters and scraper and the wheel-axle and main frame respectively, draft devices connecting with the front axle and flexible connections between the main frame and said draft devices and the wheel-axle, substantially as described.

15. An apparatus comprising a main frame with bearing-wheels and roller at the front and rear respectively, a horizontally and vertically adjustable bar located between the wheels and roller and carrying cutters and a scraper, flexible connections between said cutters and scraper and the wheel-axle and draft devices, springs mounted upon the main frame, vertical connections between the cutter-bar and said springs, a fulcrumed seat-lever connecting with the springs, and foot and hand levers connecting with the cutter-bar, whereby the cutters and scraper may be adjusted both vertically and horizontally.

In testimony whereof I have hereunto set my hand in presence of two subscribing witnesses.

DANIEL W. JONES.

Witnesses:
S. H. NOURSE,
D. B. RICHARDS.